United States Patent [19]

Duffield et al.

[11] Patent Number: 4,914,522
[45] Date of Patent: Apr. 3, 1990

[54] REPRODUCTION AND ENLARGING IMAGING SYSTEM AND METHOD USING A PULSE-WIDTH MODULATED AIR STREAM

[75] Inventors: Peter L. Duffield, Meredith; Arthur L. Cleary, Derry, both of N.H.

[73] Assignee: Vutek Inc., Meredith, N.H.

[21] Appl. No.: 343,917

[22] Filed: Apr. 26, 1989

[51] Int. Cl.⁴ .................. H04N 1/23; G01D 15/18
[52] U.S. Cl. .................... 358/296; 346/140 R; 346/75
[58] Field of Search ............ 346/140 R, 75; 358/296, 358/77

[56] References Cited

U.S. PATENT DOCUMENTS

| | | | |
|---|---|---|---|
| 2,278,940 | 4/1942 | Murphy | 358/77 |
| 3,553,371 | 1/1971 | Suenaga | 358/77 |

Primary Examiner—Bruce A. Reynolds
Assistant Examiner—Scott A. Rogers
Attorney, Agent, or Firm—E. T. Barrett

[57] ABSTRACT

A system for copying images onto a long sheet of paper or vinyl while. A flow of constant-pressure air is pulse-width modulated in accordance with the control signals and passed over an ink meniscus maintained on the end of a small nozzle. The pulse-modulated air flowing across the meniscus causes the ink to be sprayed onto the recording medium. The dot size on the image remains constant and the pulse width within each pixel is varied to produce the desired density of color. Pressure surges in the ink supply system, produced for example by vibration or acceleration of the ink, are suppressed by a second meniscus in the ink-supply system, formed by a gas bubble or interface near the nozzle meniscus. The second meniscus should have a surface area at least as large as that of the jet meniscus. At the end of each pixel, the ink flow is interrupted for a period of about 100 microseconds to restore system equilibrium. A second and continuous air flow around the air nozzle supplies air to the turbulent flow across the ink jet and reduces recirculation of atomized ink and minimizes contamination of the nozzle and adjacent surfaces. The supply roll is mounted at each end on independently movable arms.

32 Claims, 5 Drawing Sheets

REPRODUCTION AND ENLARGING IMAGING SYSTEM AND METHOD USING A PULSE-WIDTH MODULATED AIR STREAM

BACKGROUND OF THE INVENTION

1. Field of the Invention

This invention relates to systems for reproducing color images by scanning an original and using electrical signals from the scanner to control the paint-spraying of a larger duplicate image. More particularly the invention relates to such a system in which a number of spray heads reciprocate across the imaging medium while the duration of pulses of ink or paint ejected by each spray head are controlled by pulse-width modulation of a constant pressure air stream that passes over a meniscus of the ink or paint.

2. Description of Related Art

Systems have been in use for making enlarged prints, such as for billboards, in which an original image is scanned to produce control signals that operate the reproduction equipment. In most systems, the recording medium is supported by a rotating cylinder while one or more spray heads slowly traverse the width of the cylinder and spray paint or ink in accordance with the scanning signals to reproduce the image on the medium carried by the cylinder. One such system is described in U.S. Pat. No. 1,709,926 in which the original and the recording medium are each carried by a rotating cylinder. A color duplicate of the original is produced by mechanically controlling three ink jets in accordance with signals produced by scanning the original while the ink jets are moved slowly across the width of the recording medium.

U.S. Pat. No. 1,817,098 describes a facsimile system using a first drum for scanning and a second drum for recording. The initial signal is divided into color components from which electrical control signals are generated. The control signals cause electric potentials to be applied to a pair of deflection electrodes positioned on opposite sides of a stream of atomized ink particles so that the ink stream is deflected toward the recording medium when an electrical potential is applied to the electrodes. When no voltage is present on the electrodes, the ink spray is prevented from reaching the recording medium.

U.S. Pat. No. 3,553,371 describes another dual-cylinder system in which multi-color images are reproduced by using one or more ink-jet heads operated in synchronism with the scanning signals. The pressure of the air is amplitude modulated in accordance with the scanner signals and the modulated air controls a mechanical valve that regulates the rate of ink flow. The extent to which the ink valve is opened is a function of the air pressure. The same patent also describes spray heads in which the ink jet is controlled by a mechanical valve operated directly by the scanner signals without pressure modulation of the air stream.

The above patent suggests the elimination of the recording cylinder by transferring the medium from one roll to another, forming an arcuate surface in the medium between the two rollers and paint spraying the medium by the use of a rotating head.

In most spray applications, it is preferred to use an internal system in which the ink and air are expelled together. Such an arrangement provides better atomizing of the spray, but it is not satisfactory where a specific pattern of color is to be reproduced requiring instantaneous response time in the control of the ink delivery.

Jets that include a mechanical ink valve operated by the recording signals are slow and suffer from problems associated with contamination, clogging and wear of the valve mechanism. Various attempts to amplitude modulate the air stream and avoid the problems associated with variable ink valves have not been commercially successful, in part because the character of the atomized ink is a function of the pressure of the air that produces the ink spray.

SUMMARY OF THE INVENTION

As used here and in the accompanying claims, the word "ink" is to be interpreted to mean ink, pigmented paint, or other colored liquid capable of producing an image. The present system for preparing large images, such as are used for outdoor advertising, artistic representations and other purposes, has a number of important advantages by producing the image on a long sheet of medium, for example of paper or vinyl, while it is being transported from a supply-roll to a take-up roll. The width and length of the image can be varied readily without major modifications of the system; and the tedious task of securing the recording medium to a cylinder is avoided. Moreover, very long images can be produced readily whereas a cylinder to accommodate such length would be very large with all the attendant difficulties of mounting the recording medium and precisely controlling the speed of rotation of the cylinder.

The use of separate ink and air supply jets provides for easier cleaning or replacement of the ink jet, faster response time and improved repetitive performance.

In the present invention, a flow of air, supplied at a constant pressure, is turned on and off in accordance with the control signals and passed over an ink meniscus. In other words, when the air pressure is turned on to cause ink to be sprayed on the medium, it is always at the same pressure. To achieve the desired imaging, the air is pulse-width modulated. The dot size on the image remains constant and the time the air is allowed to remain on within each pixel is varied to produce the desired density of color.

A nozzle is supplied with ink that forms a small meniscus on the tip of the nozzle. The pulse-modulated air flowing across the meniscus causes the ink to be sprayed onto the recording medium. It is important that the nozzle tip be formed of material that is wetted by the ink so that the meniscus formed on the end of the nozzle remains attached to the end of the nozzle. The meniscus is thus maintained at all times at the tip of the nozzle, which is not true of systems in which the ink is forced by pressure from the nozzle or withdrawn into the nozzle at the end of each ink pulse. Systems in which the ink must be drawn through a supply tube at the beginning of each pulse, for example because the meniscus is allowed to recede into the supply tube at the end of each pulse, the response time is excessive. Such a system is also erratic because the response time for each pulse is a function of how far the meniscus has been allowed to recede into the supply tube.

The maintenance of the meniscus at the tip of the nozzle limits the maximum diameter of the nozzle with a given ink with a higher surface tension coefficient increases the maximum permitted diameter of the nozzle However, the diameter of the ink jet nozzle is related to the viscosity of the ink. If the nozzle diameter is too small, the response time and rate of flow of the ink are adversely affected and clogging of the noze may become a problem. Moreover, because the force that can be resisted by the meniscus is an inverse function of its area, the use of a larger diameter nozzle reduces the amount of negative head that can be tolerated in the ink supply. Higher viscosity ink increases the maximum permitted diameter of the nozzle, but excessive viscosity has a deleterious affect on the response time and rate of flow. It is preferred that the nozzle diameter be between 0.005 and 0.020 inches, with a preferred diameter of about 0.010 inches. The overall arrangement minimizes the problems of contaminated, clogged and worn valves and materially increases the speed and fidelity of the imaging process.

The rapid transverse movement of the spray heads necessary for a system of this type causes imperfections in the reproduced image. For example, pressure surges in the ink supply system, produced by vibration or acceleration of the ink supply system, cause changes in the rate at which the ink is delivered with resultant banding or other defects in the reproduced image. These imaging problems are overcome by providing a second meniscus in the ink-supply system, formed by a gas bubble or interface preferably as near as possible to the nozzle meniscus. The second meniscus should have a surface area at least as large as that of the jet meniscus. Preferably the second meniscus has an area several times larger than the meniscus at the nozzle tip so that internal pressure surges in the ink system are effectively damped by the second meniscus rendering the quantity of ink being delivered to the recording medium independent of pressure surges in the ink supply such as are typically caused by vibration and acceleration. The tube supporting the second meniscus should be sealed so that an air bubble is trapped at the meniscus thus permitting the necessary movement of the meniscus while preventing it from being withdrawn into the ink supply. For most applications, the level of ink supply for each spray head is maintained between that of the associated ink nozzle and about one inch lower.

The ink could be allowed to flow continuously to produce a color band across the image surface. However, in the present system, the ink flow is interrupted at the end of each pixel and the system allowed to come to equilibrium before the ink is again turned on. For example, in a system having say, 12 pixels per inch and in which the head is traveling at a rate of 40 inches per second so that the head traverses one pixel in approximately 2 milliseconds, the ink spray is never allowed to continue uninterrupted for as long as 2 milliseconds. At the end of each pixel, the ink flow is interrupted for a period of about 100 microseconds to restore system equilibrium before the next ink pulse. This arrangement provides continuing stable operation during the imaging process and produces an improved image.

In any arrangement, there is a finite period of time between the start of an air pulse and the initiation of the ink spray. This time interval must be constant and it must be short relative to the maximum pulse period. If pulses of ink are amplitude modulated as a function of the image being reproduced, the response time interval will be variable as a function of the air pressure. In the present system the air pressure is constant resulting in a constant response time interval. The use of constant velocity air and an ink meniscus that remains at the end of the ink nozzle provides a minimum response time interval that is constant from pulse to pulse. In the system described here, the minimum pulse width to produce a flow of ink is about 100 microseconds.

Figure 1:
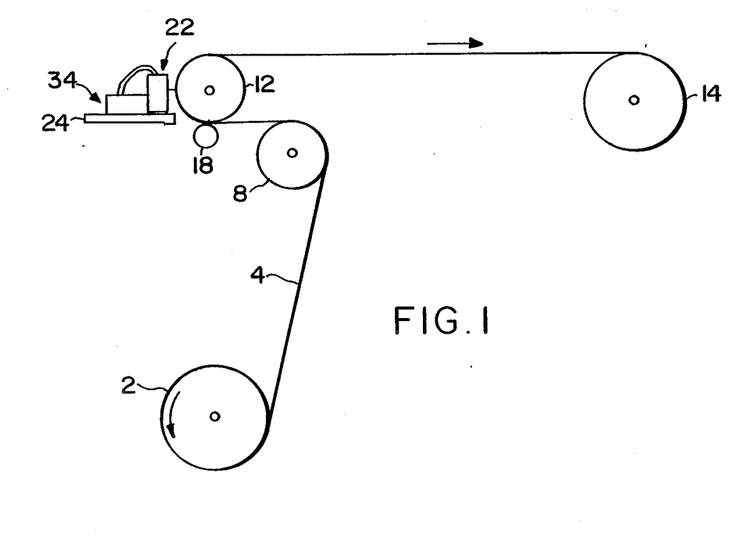
Figure 2:
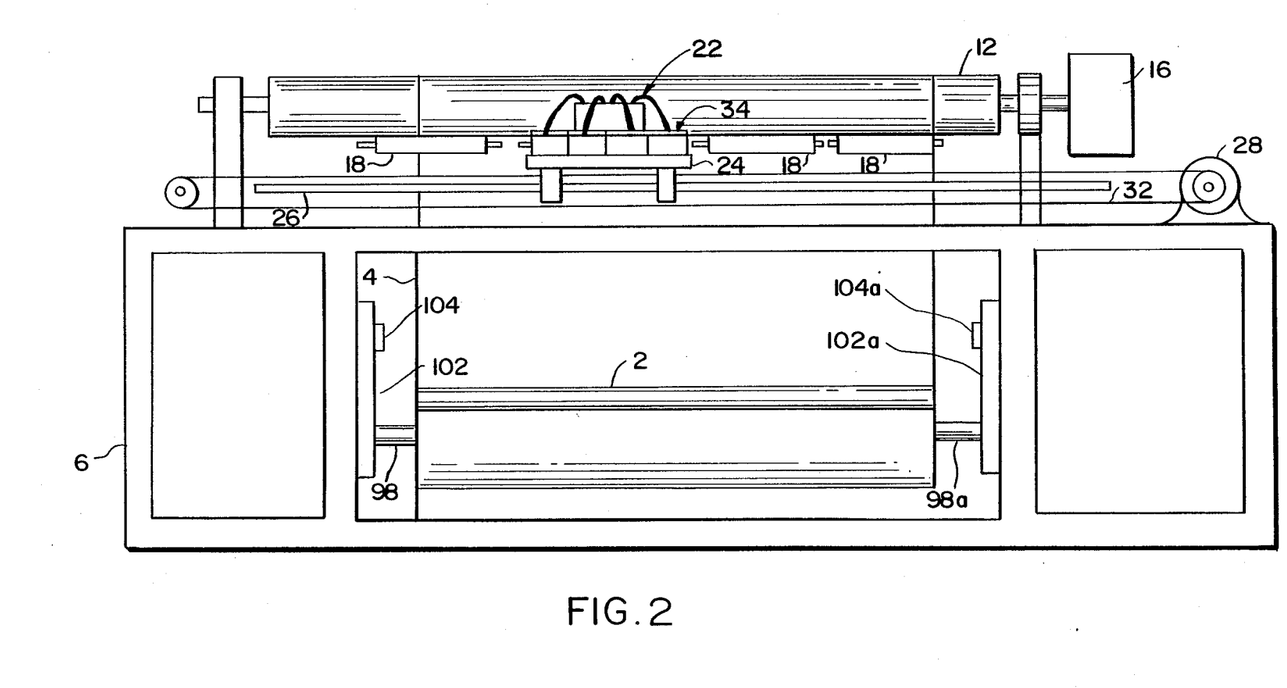
Figure 3:
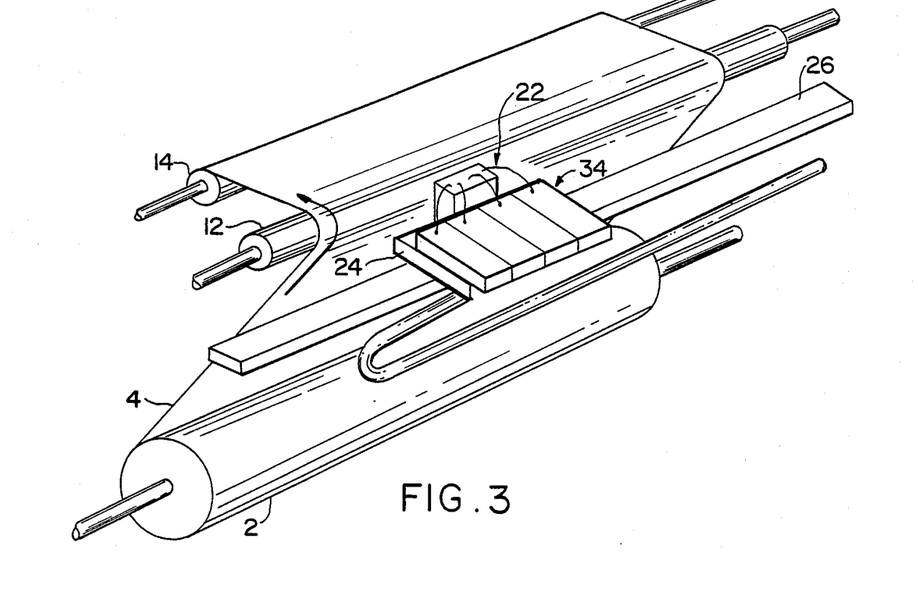

The high velocity air stream that passes over the ink meniscus to produce the spray is turbulent in nature and draws relatively large amounts of air into the stream from the surrounding air. This air flow creates a feedback air stream that recirculates the ink spray into the stream adjacent the ink nozzle. The result of this air flow is to contaminate the head in the area of the ink nozzle and to cause a build-up of ink on the nozzle and adjacent surfaces To minimize this ink build-up, a separate flow of air is provided around the ink nozzle. This flow is continuous, that is, it is not modulated on and off as is the ink control spray and provides a continuous supply of clean air to join the ink spray. This secondary air flow is not of sufficient velocity to cause ink to be withdrawn from the ink supply nozzle.

With systems in which wide strips of flexible medium are used, it is important to prevent wrinkling or excessive stress in the medium. It is important for that reason that the drive and idler rollers over which the medium passes be precisely aligned with the supply roll. This is difficult to achieve with rigid mountings unless the medium is precisely rolled at constant tension onto the supply roller, an unusual condition with commercial supplies. To eliminate the problems of wrinkling and stress in the medium, the supply roll is mounted on independently movable arms at each end of the supply roll. The supply roll is thus free to move, against gravitational forces, angularly with respect to the linear direction of medium movement as required to maintain uniform stress and wrinkle-free condition of the medium.

BRIEF DESCRIPTION OF THE DRAWING

FIG. 1 is a partial diagrammatic cross-section of an image duplicating machine embodying the invention;

FIG. 2 is a front view of the machine;

FIG. 3 is a diagrammatic perspective of certain operational parts of the machine;

FIG. 4 is a diagrammatic cross section illustrating the operation of an ink spray head;

FIG. 5 is a block diagram illustrating the sequence of operations in the image reproduction process;

FIG. 6 is a diagrammatic sectional view of a modified ink spray head; and

FIGS. 7 and 8 illustrate two additional types of spray heads in which the ink flow is controlled by diverting the air supply spray from the ink jet nozzle.

DESCRIPTION OF THE PREFERRED EMBODIMENTS

As shown in FIGS. 1–3, a roll 2 of imaging medium 4, which may be paper, vinyl or other sheet material, is supported by a frame 6 of the image reproducing system. The medium passes over an idler roller 8 (shown only in FIG. 1), around a drive roller 12 and onto a take-up roller 14.

The drive roller 12 is driven by a stepper motor 16 (FIG. 2). A series of rubber rollers 18 press against the outside of the medium 4 to prevent slippage between the medium and the outer surface of the drive roller 12. The motor 16 is coupled also, by a chain or other suitable drive means (not shown), to the take-up roller 14 through a slip clutch (not shown) that applies sufficient torque to maintain the medium 4 under tension.

Four ink spray heads, generally indicated at 22, are positioned adjacent the surface of the medium and are supported by a carriage 24. The carriage 24 is slidably mounted on a rail 26 (FIG. 3) and is driven back and forth across the medium by means of a motor drive 28 (FIG. 2) and a reversing drive cable 32. Ink for the four spray heads 22 is provided from a compartmented ink reservoir, generally indicated at 34, carrying four different colors of ink, typically cyan, magenta, yellow and black. The operation of each of the ink spray assemblies is the same so only one unit is described.

Figure 4:
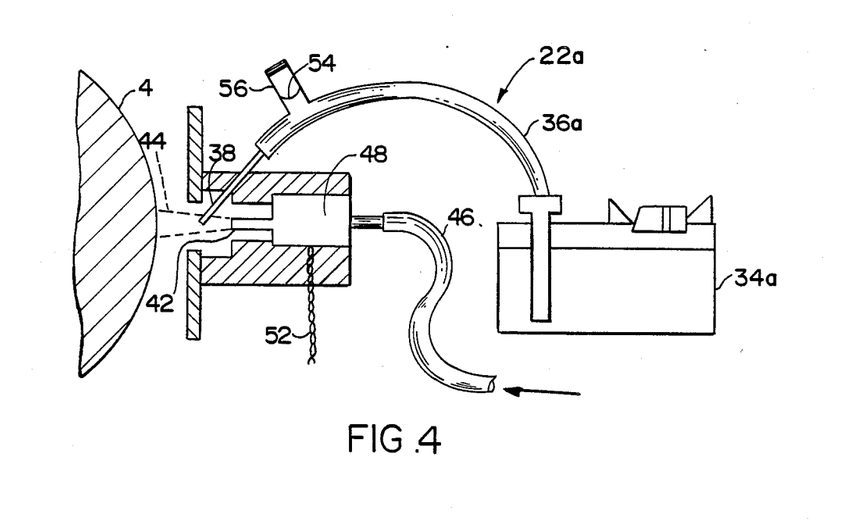
Figure 5:
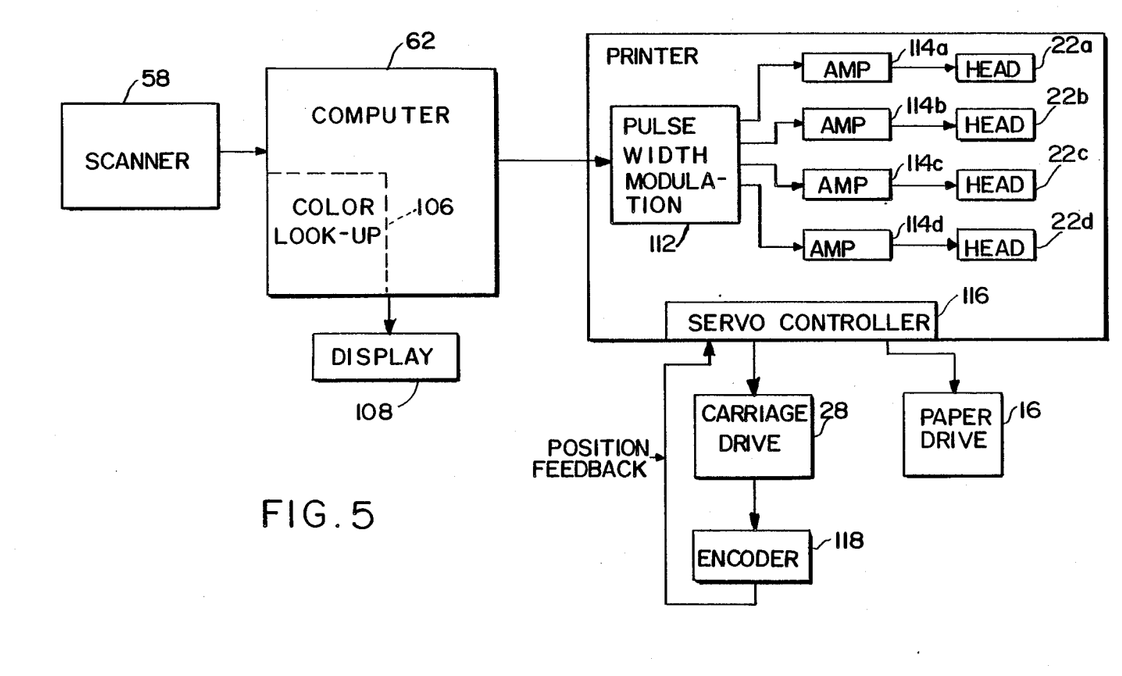

As shown in FIGS. 4 and 5, the ink reservoir 34a is connected by a flexible tube 36a to an ink spray nozzle 38. The ink in the reservoir 34a travels through the conduit 36a to form a meniscus at the end of the nozzle 38. An air nozzle 42 is positioned so that a stream of air flows across the meniscus at the end of the ink nozzle 38 causing the ink to be extracted from the nozzle 38 and atomized into a fine spray, as indicated at 44, and deposited on the medium 4. A conventional source of compressed air (not shown) is applied at constant pressure through a conduit 46 to a control valve 48. The valve 48 is opened and closed by the action of a piezo-electric actuator, to be described later. When voltage is applied to the valve through the leads 52, the valve opens to permit the air to flow through the nozzle 42. When the voltage is removed, the valve closes and no air flows through to the nozzle 42.

The maximum level of the ink in the reservoir 34a is positioned at approximately the same level as the nozzle 42 so that the level of the ink cannot rise above the level of the nozzle which would cause excessive flow of ink to the nozzle. The bottom of the ink reservoir 34a is approximately one inch below the level of the nozzle 42.

The conduit 36a that carries the ink to the nozzle 42 communicates with a second meniscus 54 that damps pressure surges in the ink supply system. The second meniscus arrangement is identical for each of the spray heads, so the description of the spray head 22a of FIG. 4 applies to all. A short branch of tubing 56 extends upwardly from the conduit 36a at a point near the ink spray nozzle 38. The upper end of the branch tubing 56 is closed and traps a small amount of air above the surface of the ink. The trapped air forms when the conduit 36a, which is initially filled with air, is connected to the ink reservoir 34a and filled with ink. The inner cross-sectional area of the branch tubing 56 is at least as large as the inner cross-sectional area of the nozzle 38 at the point where the first ink meniscus is formed. Improved damping is obtained if the area of the second meniscus is at least several times as large as the area of the meniscus formed on the end of the nozzle 38. It is preferred that the diameter of the second meniscus be 5 to 10 times the diameter of the nozzle 38.

In operation, the image to be reproduced is placed on a conventional commercial scanner 58 (FIG. 5) and the image is scanned in conventional manner. The signals from the scanner are modified by a computer 62 to achieve the desired color effects with the particular inks being used. These signals control the operation of the piezo-electric valve 48 (FIG. 4).

In this example, the image is divided into square pixels, each about 1/12 of an inch on each side. Each composite signal from the scanner 58 corresponds to one pixel from the image. The pixel signal from the image is divided by the computer 62 into appropriate signals representing the color components using conventional techniques. These signals then control the pulse widths of the air flows and thereby the duration of the spray of ink from each of the heads 22a, 22b, 22c and 22d. Each of the compartments of the ink reservoir 34 associated with one of the heads 22 carries a different color ink. The rate of ink flow is not changed as a function of the color component, only the time during each pixel that the ink is allowed to spray onto the medium 4.

At the beginning of each pixel, a signal from the original image is transmitted to the appropriate spray head which is turned on for a length of time required to give the desired color perception. For example, at the beginning of a pixel, the control signals might indicate that the cyan head 22a is to be turned on for a period of 600 microseconds, the yellow head 22c is to be turned on for a period of 1200 microseconds, the magenta head 22b is to be turned on for a period of 300 microseconds, and the head 22d carrying the black ink is not turned on during this particular pixel.

At the end of each pixel, each of the spray heads is turned off for a period of about 100 microseconds to bring the system into stable equilibrium before the next pixel begins.

Obviously, one or more spray heads may not be used for a considerable period of time as a function of the colors being reproduced. To prevent the drying of the ink meniscus on the nozzles 38 during such a period, the control circuits cause the carriage 24 periodically to pass beyond the edge of the image being reproduced. Each spray head is then automatically discharged into a purge station for a short period to supply fresh ink to its meniscus. The drive roller 12 is driven incrementally by the motor 16 to advance the recording medium by one line at the end of each scan of the carriage 24.

Figure 6:
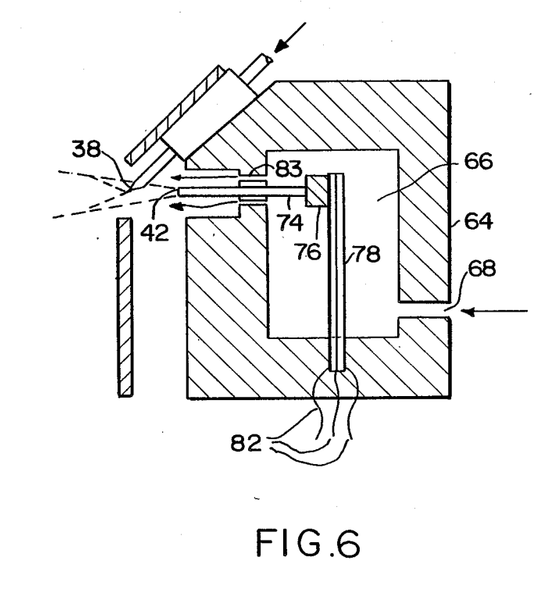
Figure 7:
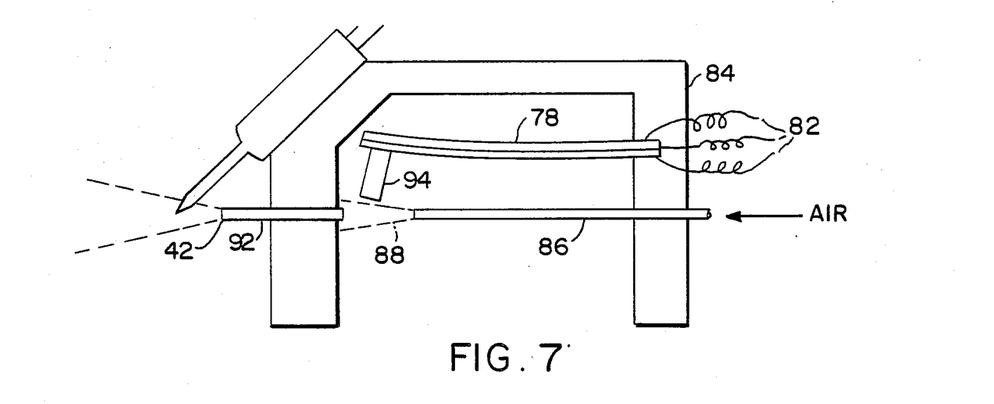
Figure 8:
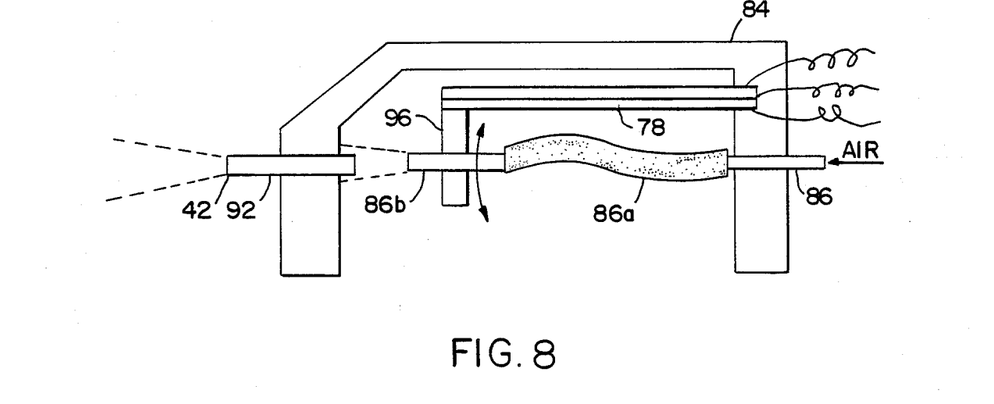

Alternate head constructions are illustrated by FIGS. 6, 7 and 8, in which certain parts corresponding to parts previously described are indicated by the same or similar numbers. In FIG. 6, a second air stream is provided to supply air to the jet stream from the air nozzle. A housing 64 forms a cavity 66 that is supplied with compressed air at constant pressure through an inlet opening 68. An air jet nozzle 42 is coupled to the cavity 66 through a length of conduit 74. The inner end of the conduit opens into the cavity 66, but can be sealed by a pad 76 that is actuated by a conventional piezo-electrically driven arm 78. When voltage is applied to the arm through the leads 82, the arm 78 flexes toward the right as viewed in FIG. 6 moving the pad 76 from the end of the conduit 74 allowing the air to escape from the nozzle 42 and draw ink from the ink jet nozzle 38. As in the previous example, a meniscus of ink is maintained on the end of the nozzle 38 and provides ink for the atomized spray whenever the air is allowed to exit from the nozzle 42.

An air channel 83 is provided around the conduit 74 where it passes through the wall of the housing 64. Air which is under continuous pressure within the cavity 66 passes through this channel to form a flow of air that surrounds the air nozzle 42. This continuous air flow provides a source of air for the turbulent jet stream formed by the nozzle 42 and minimizes recirculation of the atomized ink spray and materially decreases the amount of deposition around the ink jet nozzle 38 and adjacent surfaces.

In the arrangement of FIG. 7, the air is not turned on and off by means of valves as in the previous construction, but rather the air stream is diverted from the meniscus The result is that the air is turned on and off so far as the ink meniscus is concerned, but the air stream continues to flow at a constant rate at all times. This arrangement eliminates the problems invariably associated with mechanical valves that open and close, and provides a constant air pressure that is unaffected by changes in the rate of flow. A bracket 84 supports an inlet conduit that provides a constant flow of pressurized air to form a first jet indicated at 88. A second length of conduit 92 is positioned to receive the air impressed upon it by the air jet 88. This air passes through the conduit 92 to the air spray nozzle 42. As previously described this air jet draws the ink from the ink jet nozzle 38 and atomizes it for application to the imaging medium.

A baffle 94 is secured to the end of a conventional piezo-electric arm 78 that is supported by the bracket 84. When voltage is applied to the arm 78 through the leads 82, the arm flexes into the position shown in FIG. 7 and permits the free flow of air through the air nozzle 42. When the voltage is removed from the arm, the arm returns to its unflexed position and moves the baffle 94 into position to intercept the flow of air to the nozzle 42. Thus, the air flow is constant and the control of the ink pattern is accomplished by pulse width modulation of the arm 78.

FIG. 8 illustrates a similar arrangement in which the inlet air conduit 86 includes a flexible section 86a. The opposite end of this flexible section is connected to another rigid conduit section 86b that is supported by an extension 96 secured to the end of the piezo-electric arm 78. When the voltage applied to the arm 78 causes it to flex in a downward direction, as viewed in FIG. 8, the end of the conduit 86b is directed downwardly at an angle such that its output of air does not impinge on the open end of the conduit 92 and thus no air flows from the nozzle 42. When the voltage is removed, the arm 78 returns to the position shown and the air flow and ink atomization are resumed. As in the previous examples an ink supply jet is positioned appropriately in the air spray pattern from the, nozzle 42.

It is important to maintain the paper or other medium 4 for movement precisely perpendicular to the axes of the idler and drive rollers 8 and 12 to prevent wrinkling or uneven tension in the medium. For that reason, the supply roll 2 (FIG. 2) is supported by two spindles 98 and 98a which extend into the ends of the roll 6. The spindle 98 is supported by an arm 102 the opposite end of which is pivotally mounted by a support 104 on the frame 6. The other spindle 98a is similarly mounted on the frame 6 by an arm 102a and a support 104a. With this arrangement, each end of the supply roll 2 is independently supported so that the forces of gravity maintain the width of the medium 4 under equal and constant tension.

In operation, the scanner 58 (FIG. 5) inspects the image to be reproduced laterally pixel-by-pixel and vertically line-by-line. For each pixel, a composite signal is generated carrying the color information. These signals are fed into a color look-up table 106 that forms part of the computer 62 by which the scanner signals are converted into data that controls the intensity of each of the four output colors. The scanned image is displayed on a computer display 108 so that the operator may make any desired adjustments in color balance. The signals from the computer are fed into a pulse width modulator 112. For each pixel of the scanned image, four signals are generated having a width that is a function of the intensity of that particular color for that particular pixel. The wider the pulse, the longer the corresponding spray will stay on and the more intense the color. The signals from the pulse width modulator 112 are amplified by four amplifiers 114a, 114b, 114c, and 114d. The signals from each of the amplifiers is fed into a corresponding spray head 22a, 22b, 22c or 22d, where a pulse of air is produced whose duration is a function of the width of the pulse from the modulator 112.

A servo controller 116 provides signals that control the drive motor 28 that moves the carriage 24 and the spray heads 22 on the rail 26. An encoder 118 feeds back to the servo controller 116 a signal representing the actual position of the carriage 24 on the rail 26 to maintain precise control of the printing action. The servo controller also provides the signals that operate the paper drive 16 to move the recording medium one line at the end of each sweep of the carriage.

What is claimed is:

1. In a system for reproducing an image, the combination comprising
    scanner means for scanning an image to be reproduced and generating control signals therefrom,
    a medium on which the image is to be reproduced,
    drive means for transporting said medium,
    an ink spray head positioned adjacent said medium,
    carriage means for moving said head laterally across the width of said medium, and
    a source of air at substantially constant pressure,
    said head including
        an ink spray nozzle,
        an ink supply reservoir,
        conduit means connecting said reservoir to said nozzle to form a first meniscus of said ink on said nozzle,
        means communicating with said conduit means for forming a second meniscus of said ink having an area at least as large as the area of said first meniscus,
        means directing said air across said first meniscus to spray said ink on said medium, and
        means for pulse-width modulating the flow of said air in accordance with said control signals.
2. The combination as claimed in claim 1 wherein the diameter of said second meniscus is at least twice as large as the diameter of said first meniscus.
3. The combination as claimed in claim 1 wherein the diameter of said second meniscus is between five and ten times the diameter of said first meniscus.
4. The combination as claimed in claim 1 including
    a supply roller for holding said imaging material on which the image is to be reproduced,
    a take-up roller for receiving the imaged medium, and
    incremental drive means for moving said medium in a direction perpendicular to the direction of motion of said head in predetermined incremental steps.
5. The combination as claimed in claim 1 wherein said means for pulse-width modulating said air flow includes
    piezo-electric valve means for turning said air off and on prior to passing over said first meniscus.
6. The combination as claimed in claim 1 where said means for pulse-width modulating said air flow includes
    deflection means for deflecting said air flow from said first meniscus in accordance with said control signals.
7. The combination as claimed in claim 1 including
    means for maintaining the level of ink in said reservoir between a minimum level not lower than about one inch below the level of said first meniscus and a maximum level not significantly higher than the level of said first meniscus.

8. The combination as claimed in claim 1 wherein said reproduced image is formed of lines each containing a predetermined number of pixels, and including
   means for turning said air flow off for a predetermined period at the end of each pixel.

9. The combination as claimed in claim 1 including means directing a constant flow of pressurized air around the outside of said ink spray nozzle.

10. The combination as claimed in claim 5 including means for maintaining the level of ink in said reservoir between a minimum level about one inch below the level of said first meniscus and a maximum level about the level of said first meniscus.

11. The combination as claimed in claim 6 including means for maintaining the level of ink in said reservoir between a minimum level not lower than the level of said first meniscus and a maximum level not higher than about one inch above the level of said first meniscus.

12. In a system for reproducing an image, the combination comprising
   scanner means for scanning an image to be reproduced and generating control signals therefrom,
   a medium on which the image is to be reproduced,
   drive means for transporting said medium,
   an ink spray head positioned adjacent said medium,
   carriage means for moving said head laterally across the width of said medium, and
   a source of air at substantially constant pressure,
   said head including
      a spray nozzle,
      an ink supply reservoir,
      conduit means connecting said reservoir to said nozzle to form a meniscus of said ink on said nozzle,
      means directing said air across said meniscus to spray said ink on said medium, and
      means for pulse-width modulating the flow of said air in accordance with said control signals.

13. The combination as claimed in claim 12 including means for maintaining said meniscus in the absence of air flow thereacross.

14. The combination as claimed in claim 13 wherein said means for pulse width modulating said air flow includes
   deflection means for deflecting said air flow from said meniscus in accordance with said control signals.

15. In a system for reproducing an image, the combination comprising
   scanner means for scanning an image to be reproduced and generating control signals therefrom,
   a medium on which the image is to be reproduced,
   a frame,
   drive means for supporting and transporting said medium including
      a supply roll carrying a roll of said medium,
      support means for said roll including
         means at each end of said roll each having
            a spindle extending into said roll,
            an arm extending from said spindle, and
            means pivotally securing said arm to said frame,
   an ink spray head positioned adjacent said medium,
   carriage means for moving said head laterally across the width of said medium.
   pulse-width modulating the flow of a constant pressure air stream in accordance with said control signals, and
   actuating said spray head in accordance with the flow of said air.

16. In a system for reproducing an image, the combination comprising
   scanner means for scanning an image to be reproduced and generating control signals therefrom representing a plurality of scanning lines each containing a predetermined number of pixels,
   a medium on which the image is to be reproduced,
   drive means for transporting said medium,
   an ink spray head positioned adjacent said medium including
      a spray nozzle,
      an ink supply reservoir, and
      conduit means connecting said reservoir to said nozzle,
   carriage means for moving said head laterally across the width of said medium,
   control means responsive to said control signals for controlling the flow of said ink from said spray head by pulse-width modulating the flow of a constant pressure air steam from said spray head in accordance with said control signals, and
   stabilization means for interrupting of said ink or the flow of said air from said spray head for a predetermined stabilization period during each of said pixels.

17. The combination as claimed in claim 16 wherein the duration of said stabilization period is about 100 microseconds.

18. In a system for reproducing an image, the method comprising the steps of
   scanning an image to be reproduced and generating control signals therefrom,
   positioning an ink spray head adjacent a medium on which the image is to be reproduced,
   moving said head laterally across the width of said medium,
   pulse-width modulating the flow of a constant pressure air stream in accordance with said control signals, and
   actuating said spray head in accordance with the flow of said air.

19. The method as claimed in claim 18 wherein said control signals represent a plurality of scanning lines each containing a predetermined number of pixels, and including the step of
   interrupting the flow of said air for a predetermined period during each pixel.

20. The method as claimed in claim 19 wherein the duration of said interruptions is about 100 microseconds.

21. The method as claimed in claim 18 including the steps of
   forming a first ink meniscus at the end of an ink supply nozzle, and
   directing the flow of said air across the face of said first meniscus thereby to create an ink spray.

22. The method as claimed in claim 21 including the step of
   forming a second ink meniscus adjacent said first meniscus and having an area at least as large as the area of said first meniscus.

23. The method as claimed in claim 22 wherein
the area of said second meniscus is at least several times as large as the area of said first meniscus.

24. The method as claimed in claim 21 including the step of
turning said air flow off and on to control said spray in accordance with said control signals.

25. The method as claimed in claim 21 including the step of
deflecting said air flow from said meniscus to control said spray in accordance with said control signals.

26. An ink spray head comprising
an ink reservoir containing a supply of ink,
an ink spray nozzle,
conduit means connecting said reservoir to said ink spray nozzle,
means for forming and maintaining a first ink meniscus at the end of said ink spray nozzle,
an air spray nozzle connected to a source of air at constant pressure and positioned to direct a flow of air across said first meniscus, and
means for turning the flow of said air off and on in accordance with predetermined control signals, the said flow of air being constant across said meniscus at all times when the air flow is turned on.

27. The combination as claimed in claim 26 including
means forming a second air flow around the outside of said air spray nozzle, whereby air is supplied to the spray created by said flow of air across said first meniscus.

28. The combination as claimed in claim 26 wherein
the level of said ink in said reservoir is maintained between the level of said ink spray nozzle and a level about one inch lower.

29. The combination as claimed in claim 26 including
means communicating with said conduit forming a second ink meniscus having an area at least as large as the area of said first meniscus.

30. The combination as claimed in claim 29 wherein
the area of said second meniscus is at least several times as large as the area of said first meniscus.

31. The combination as claimed in claim 26 wherein
said means for turning said air flow off and on includes movable means for deflecting said air flow away from said air spray nozzle.

32. The combination as claimed in claim 26 including
means forming a second air flow around the outside of said air spray nozzle, whereby air is supplied to the spray created by said flow of air across said first meniscus, and
means communicating with said conduit forming a second ink meniscus having an area at least as large as the area of said first meniscus, and wherein
the level of said ink in said reservoir is maintained between the level of said ink spray nozzle and a level about one inch lower, and
said means for turning said air flow off and on includes movable means for deflecting said air flow away from said air spray nozzle.

* * * * *

UNITED STATES PATENT AND TRADEMARK OFFICE
CERTIFICATE OF CORRECTION

PATENT NO. : 4,914,522

DATED : April 3, 1990

INVENTOR(S) : Duffield et al

It is certified that error appears in the above-identified patent and that said Letters Patent is hereby corrected as shown below:

Column 3, line 2, change "noze" to --nozzle--

Column 10, line 29, (Claim 16) after "interrupting" insert --the flow--.

Signed and Sealed this

Twenty-fifth Day of June, 1991

Attest:

HARRY F. MANBECK, JR.

Attesting Officer

Commissioner of Patents and Trademarks